United States Patent
Bhatt et al.

(10) Patent No.: US 7,738,432 B2
(45) Date of Patent: Jun. 15, 2010

(54) DYNAMIC NETWORK ACTIVATION APPARATUS, SYSTEMS, AND METHODS

(75) Inventors: Dhiraj Bhatt, Portland, OR (US); Matthew C. Curfman, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 1143 days.

(21) Appl. No.: 10/953,172

(22) Filed: Sep. 28, 2004

(65) Prior Publication Data
US 2006/0072521 A1    Apr. 6, 2006

(51) Int. Cl.
H04W 4/00 (2009.01)
H04L 12/28 (2006.01)
H04L 12/54 (2006.01)
G08C 17/00 (2006.01)

(52) U.S. Cl. .................. 370/338; 370/419; 370/428; 370/311; 455/422.1; 455/432.1

(58) Field of Classification Search .................. None
See application file for complete search history.

(56) References Cited

U.S. PATENT DOCUMENTS

| | | | |
|---|---|---|---|
| 6,959,009 B2 * | 10/2005 | Asokan et al. | 370/475 |
| 7,272,215 B2 * | 9/2007 | Bremer et al. | 379/93.09 |
| 7,277,737 B1 * | 10/2007 | Vollmer et al. | 455/574 |
| 2001/0006519 A1 * | 7/2001 | Voit | 370/352 |
| 2002/0115481 A1 * | 8/2002 | Saito | 455/574 |
| 2003/0123423 A1 * | 7/2003 | Okanoue | 370/338 |
| 2003/0142650 A1 * | 7/2003 | Fan | 370/338 |
| 2003/0154306 A1 * | 8/2003 | Perry | 709/245 |
| 2004/0081109 A1 * | 4/2004 | Oishi | 370/310 |
| 2004/0128577 A1 * | 7/2004 | Silvester | 713/324 |
| 2004/0224659 A1 * | 11/2004 | Cheng | 455/404.1 |
| 2004/0258021 A1 * | 12/2004 | Kashimoto et al. | 370/331 |
| 2005/0138178 A1 * | 6/2005 | Astarabadi | 709/227 |
| 2005/0152363 A1 * | 7/2005 | Malik et al. | 370/389 |
| 2005/0220079 A1 * | 10/2005 | Asokan | 370/352 |
| 2005/0223095 A1 * | 10/2005 | Volz et al. | 709/225 |
| 2005/0259612 A1 * | 11/2005 | Yarlagadda | 370/328 |
| 2006/0034213 A1 * | 2/2006 | Munje et al. | 370/328 |
| 2006/0209753 A1 * | 9/2006 | Patel | 370/329 |
| 2008/0056226 A1 * | 3/2008 | Zhao et al. | 370/342 |
| 2008/0267103 A1 * | 10/2008 | Xue et al. | 370/310 |

* cited by examiner

*Primary Examiner*—Hong Cho
*Assistant Examiner*—Hicham B Foud
(74) *Attorney, Agent, or Firm*—Schwegman, Lundberg & Woessner, P.A.

(57) ABSTRACT

Apparatus, systems, methods, and articles herein interact with an operating system in a network client to simulate an "always connected" network connection model. Upon activation, a network driver implementing embodiments herein indicates to the operating system that a network connection has been established, whether or not an actual connection is established. Some embodiments may also present a pseudo network address (e.g., an IP address) to the operating system in the case of a virtual network connection. Upon sensing an actual physical network connection, embodiments herein may handshake with the operating system to establish a real network connection, including communicating a network-assigned network address to the operating system. The operating system may in turn report (or continue to report) an active connection to application programs so that a user need not repeatedly re-activate the network connection manually. Other embodiments are described and claimed.

7 Claims, 3 Drawing Sheets

DYNAMIC NETWORK ACTIVATION APPARATUS, SYSTEMS, AND METHODS

TECHNICAL FIELD

Various embodiments described herein relate to communications generally, including apparatus, systems, and methods used to transmit and receive information via wireless networks.

BACKGROUND INFORMATION

Subscribers to a wireless mobile service, including a global system for mobile communications (GSM) wireless service, may use a general packet radio service (GPRS) for Internet protocol (IP) communications. GPRS facilities may include serving GPRS support nodes (SGSNs) and/or gateway GPRS support nodes (GGSNs). A GSM/GPRS device may connect to a distant IP network by activating a logical channel within the SGSN/GGSN structure, known as a packet data protocol (PDP) "context."

A client may establish a PDP context by taking affirmative action (similar to that required to establish a dial-up modem connection). The GSM/GPRS network may issue an IP address during activation of the PDP context. A wireless provider may deactivate a client's PDP context when no activity has been sensed for a selected period in order to conserve packet-switched and/or other network resources; and the deactivated client may indicate a state of disconnection from the network.

Information on GSM/GPRS operations is currently available from the Internet at a site of the GSM Association in GSM Association document PRD IR-40, "Guidelines for IP4 Addressing and AS Numbering for GPRS Network Infrastructure and Mobile Terminals, Version 3.1.0: 2001.

DETAILED DESCRIPTION

An Internet user may prefer an "always-connected" network connection model (e.g., a connection associated with cable modem service and/or data subscriber line (DSL) service) to a "switched-connection" (e.g., a dial-up modem connection) model, since the switched-connection model may require affirmative action by the user to connect to a network. As a matter of contrast, the always-connected model may permit initialization of application programs associated with Internet access before they are actually needed, avoiding the wait for network connection and application initialization.

Various embodiments described herein may simulate an always-connected experience for a GSM/GPRS user by providing a "virtual connection," an indication to an operating system (OS) that a network connection exists during periods when no actual network connection (e.g., no PDP context) may be active. Activating a virtual connection may be appropriate, for example, upon system initialization, and/or upon sensing deactivation of a pre-existing PDP context.

Thus, a client operating system may be provided a temporary IP address associated with a virtual connection, in lieu of a GPRS-provided public IP address associated with an actual PDP context. The temporary address may (optionally) be selected from blocks of addresses denominated "private" by the Internet Assigned Numbers Authority (IANA). Further information regarding private addresses may be found in the Network Working Group Request For Comments (RFC) 1918, dated February 1996.

Some embodiments disclosed herein may transition from a virtual connection to a real connection by activating a PDP context upon receiving an IP packet for transmission to the network. The transition may include re-writing an IP packet address header with a GPRS-supplied address prior to transmitting the packet, and/or passing the GPRS-supplied address to the OS. Some disclosed embodiments may re-establish a virtual connection upon sensing a deactivation of the PDP context.

In some embodiments herein, a client may receive a GPRS-supplied address as an optional field in a PDP context activation message, for example, and the address may be passed to the OS in response to a receipt of a DHCPREQUEST packet. An IP address so assigned may appear to the OS as though originated at a DHCP server on the local network.

Figure 1:
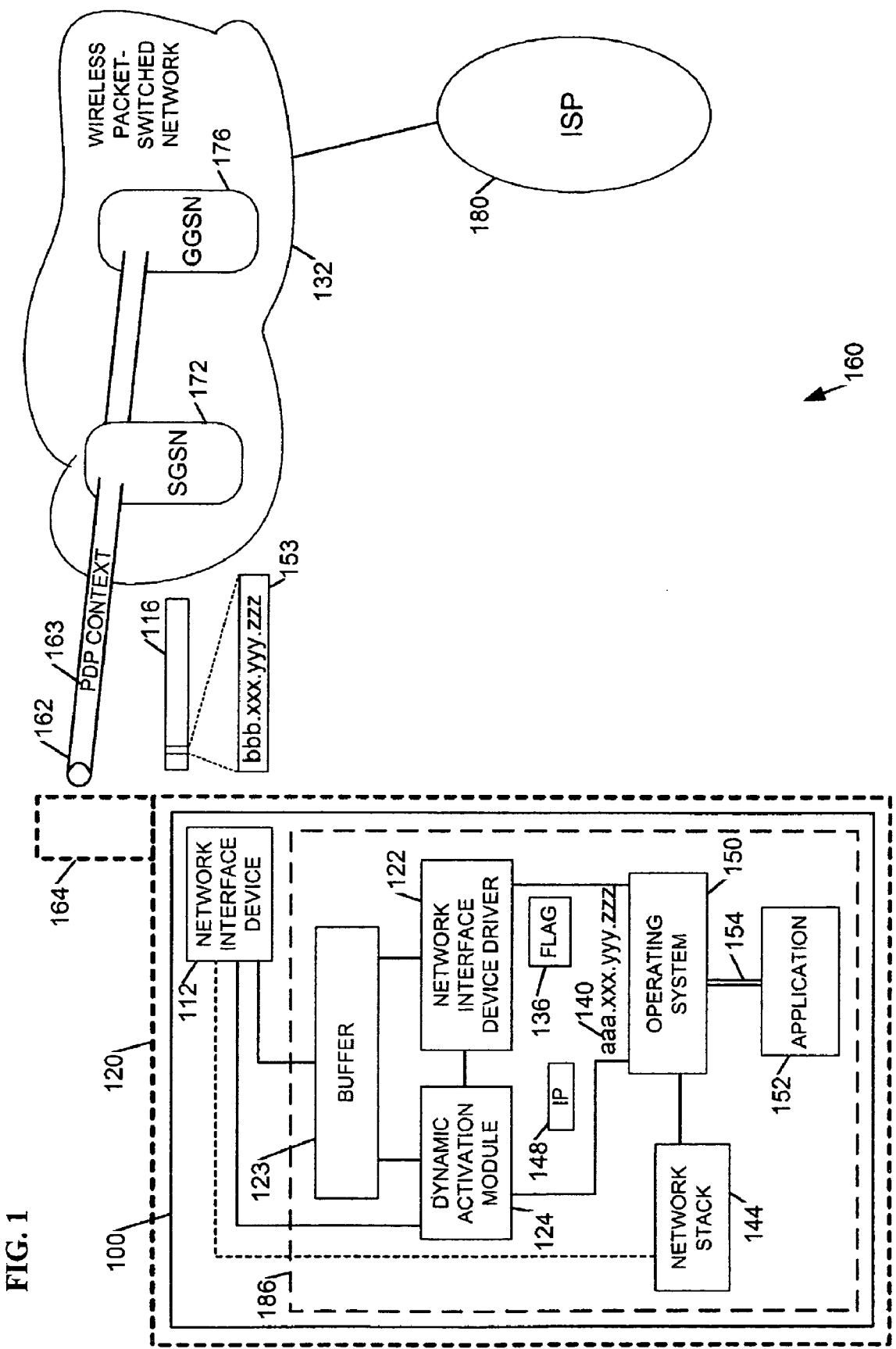
FIG. 1 is a block diagram of an apparatus and a system according to various embodiments of the invention.

FIG. 1 comprises a block diagram of an apparatus 100 and a system 160 according to various embodiments of the invention. The apparatus 100 may include a network interface device 112, perhaps comprising a wireless physical layer module to encode a data packet 116 for transmission from a mobile device 120. In some embodiments, the apparatus 100 may also include a network interface device driver module 122 to couple to the network interface device 112. Some embodiments may include a packet buffer 123 to couple to the network interface device 112, to buffer the data packet 116.

The apparatus 100 may also include a dynamic activation module 124 to couple to the network interface device 112 and/or to the network interface device driver module 122, to open a virtual and/or a real network connection. The virtual network connection may comprise an indication 136 that a network 132 is ready (e.g., setting a flag and/or sending an inter-process communications message), and/or a provision of a private IP address 140 during a time of actual disconnection from the network 132. The indication 136 that the network 132 is ready may allow an IP network stack 144 to send data packet(s) 148 directly, by inter-process communication, and/or by command, during the time of actual disconnection from the network 132. A real network connection may comprise an indication 136 that a network 132 is ready, and/or a provision of an actual IP address 153 associated with the network 132.

In some embodiments of the apparatus 100, an operating system 150 may be coupled to the dynamic activation module 124 and/or to the network interface device driver module 122. In some embodiments, the dynamic activation module 124 may be responsive to a request from the operating system 150, including perhaps a request to utilize the network 132. Some embodiments of the apparatus 100 may include at least one application module 152 to open a network socket 154 to the operating system 150.

In some embodiments of the apparatus 100, the network interface device 112 may comprise a wireless device, and/or it may be included in the mobile device 120. The network interface device 112 and/or the mobile device 120 may comprise a GSM device and/or a GPRS device. Examples of such devices may include a cellular telephone supporting Internet access from the telephone display, and/or a cellular telephone coupled to a laptop computer for use as a wireless modem. Other embodiments may be realized.

For example, a system 160 may include a network interface device 112 and/or a dynamic activation module 124 to couple to the network interface device 112, perhaps to open a virtual and/or real network connection, as previously described. The virtual network connection may comprise a network socket 154 and/or an operating system socket. In some embodiments of the system 160, the real network connection may comprise a wireless connection 162, including, perhaps, a packet data protocol (PDP) context 163.

Some embodiments of the system 160 may include an antenna 164 and/or a wireless packet-switched network 132 to couple to the network interface device 112. The antenna 164 may comprise a number of types, including patch, omni-directional, beam, monopole, dipole, rhombic, and/or log periodic antennas, among others.

The wireless packet-switched network may comprise a serving GPRS support node (SGSN) 172, a backbone GPRS support node (GGSN) 176, and/or an Internet service provider (ISP) 180. In some embodiments of the system 160, a network computing device 186 may be coupled to the network interface device 112 (e.g., a laptop computer coupled to a cellular telephone).

The apparatus 100; device 112; data packet 116; mobile device 120; driver module 122; packet buffer 123; dynamic activation module 124; network 132; indication 136; IP addresses 140, 153; IP network stack 144; data packet(s) 148; operating system 150; application module 152; network socket 154; system 160; wireless connection 162; PDP context 163; antenna 164; SGSN 172; backbone GGSN 176; ISP 180; and network computing device 186 may all be characterized as "modules" herein.

Such modules may include hardware circuitry, single and/or multi-processor circuits, memory circuits, and combinations thereof, as desired by the architect of the apparatus 100 and system 160, and as appropriate for particular implementations of various embodiments.

It should also be understood that the apparatus and systems of various embodiments can be used in applications other than dynamic network activation, and thus, various embodiments are not to be so limited. The illustrations of apparatus 100 and systems 160 are intended to provide a general understanding of the structure of various embodiments, and they are not intended to serve as a complete description of all the elements and features of apparatus and systems that might make use of the structures described herein.

Applications that may include the novel apparatus and systems of various embodiments include electronic circuitry used in high-speed computers, communication and signal processing circuitry, modems, single and/or multi-processor modules, single and/or multiple embedded processors, data switches, and application-specific modules, including multi-layer, multi-chip modules. Such apparatus and systems may further be included as sub-components within a variety of electronic systems, such as televisions, cellular telephones, personal computers, workstations, radios, video players, vehicles, and others. Some embodiments may include a number of methods.

Figure 2:
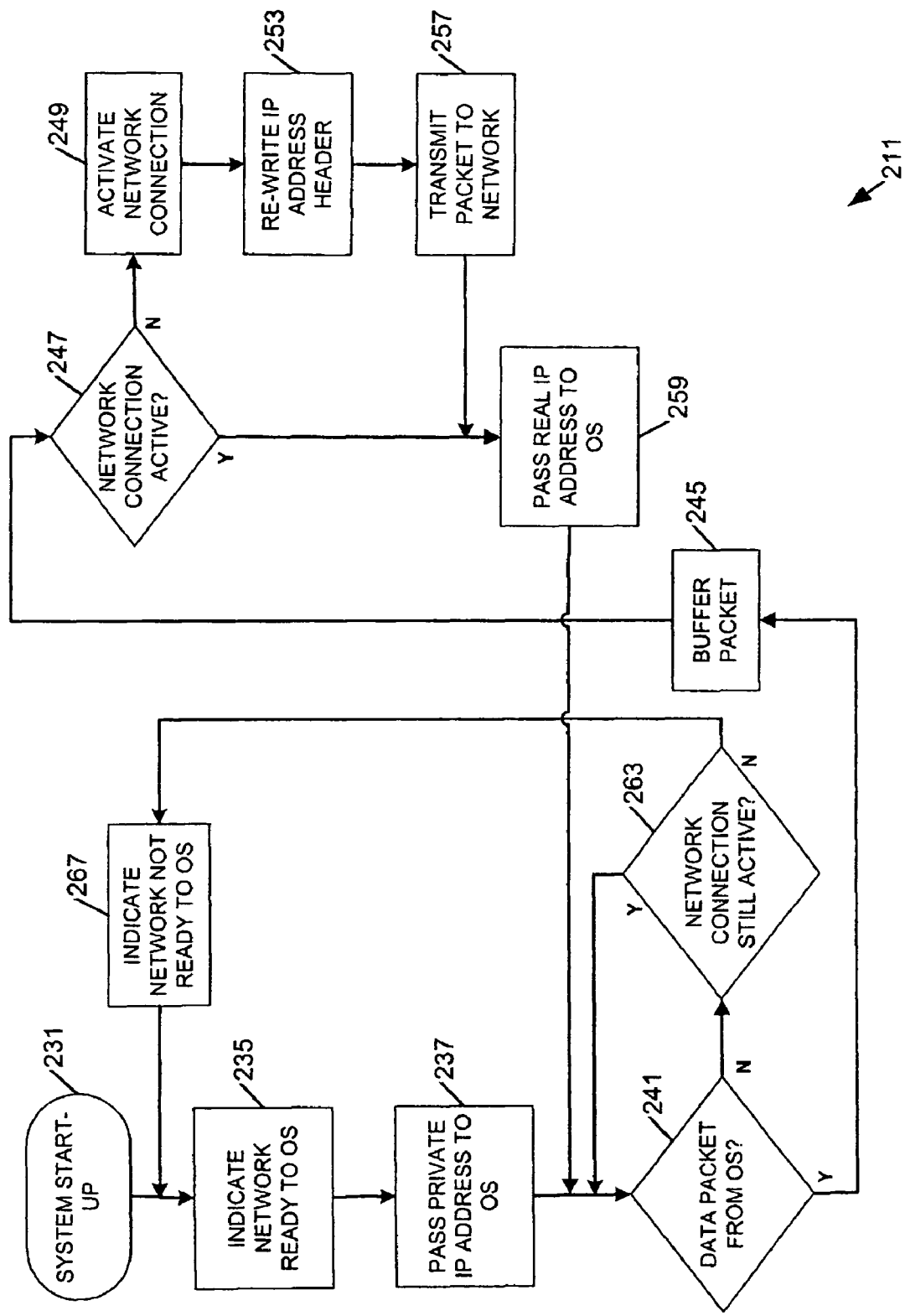
FIG. 2 is a flow diagram illustrating several methods according to various embodiments of the invention.

For example, FIG. 2 is a flow diagram illustrating several methods 211 according to various embodiments of the invention. A method 211 may (optionally) begin at block 231 with system start-up, which may comprise applying power to a wireless device and/or booting an operating system. The method 211 may include handshaking with an operating system to indicate a connection to a network at approximately a time of driver initialization and/or during a time of sensing a state of disconnection from the network, at block 235. The method 211 may also include passing an IP address, public and/or private, to the operating system at block 237.

The method 211 may further include receiving an IP packet from the operating system at block 241, and/or buffering the packet at block 245. The method 211 may continue with determining the existence of a currently active network connection at block 247. The method 211 may further continue with opening a network connection, such as a wireless network connection, at approximately a time of receiving a request from the operating system to utilize the network at block 249. The wireless network connection may comprise a PDP context. It should be noted that the PDP context may occur within a GPRS system, and that the GPRS system may be included in a GSM infrastructure.

The method 211 may include re-writing an IP address obtained from the network connection into an address header of the packet to be transmitted at block 253, and/or forwarding the packet to the network at block 257. The method 211 may also include passing to the operating system an IP address obtained from the network, at block 259. The method 211 may include sensing a state of disconnection from the network at block 263, and/or handshaking with the operating system to indicate the state of disconnection at block 267.

It should be noted that the methods described herein do not have to be executed in the order described, or in any particular order. Moreover, various activities described with respect to the methods identified herein can be executed in repetitive, serial, or parallel fashion. Information, including parameters, commands, operands, and other data, can be sent and received in the form of one or more carrier waves.

Upon reading and comprehending the content of this disclosure, one of ordinary skill in the art will understand the manner in which a software program can be launched from a computer-readable medium in a computer-based system to execute the functions defined in the software program. One of ordinary skill in the art will further understand the various programming languages that may be employed to create one or more software programs designed to implement and perform the methods disclosed herein. The programs may be structured in an object-orientated format using an object-oriented language such as Java or C++. Alternatively, the programs can be structured in a procedure-orientated format using a procedural language, such as assembly or C. The software components may communicate using any of a number of mechanisms well known to those skilled in the art, such as application program interfaces or interprocess communication techniques, including remote procedure calls. The teachings of various embodiments are not limited to any particular programming language or environment. Thus, other embodiments may be realized.

Figure 3:
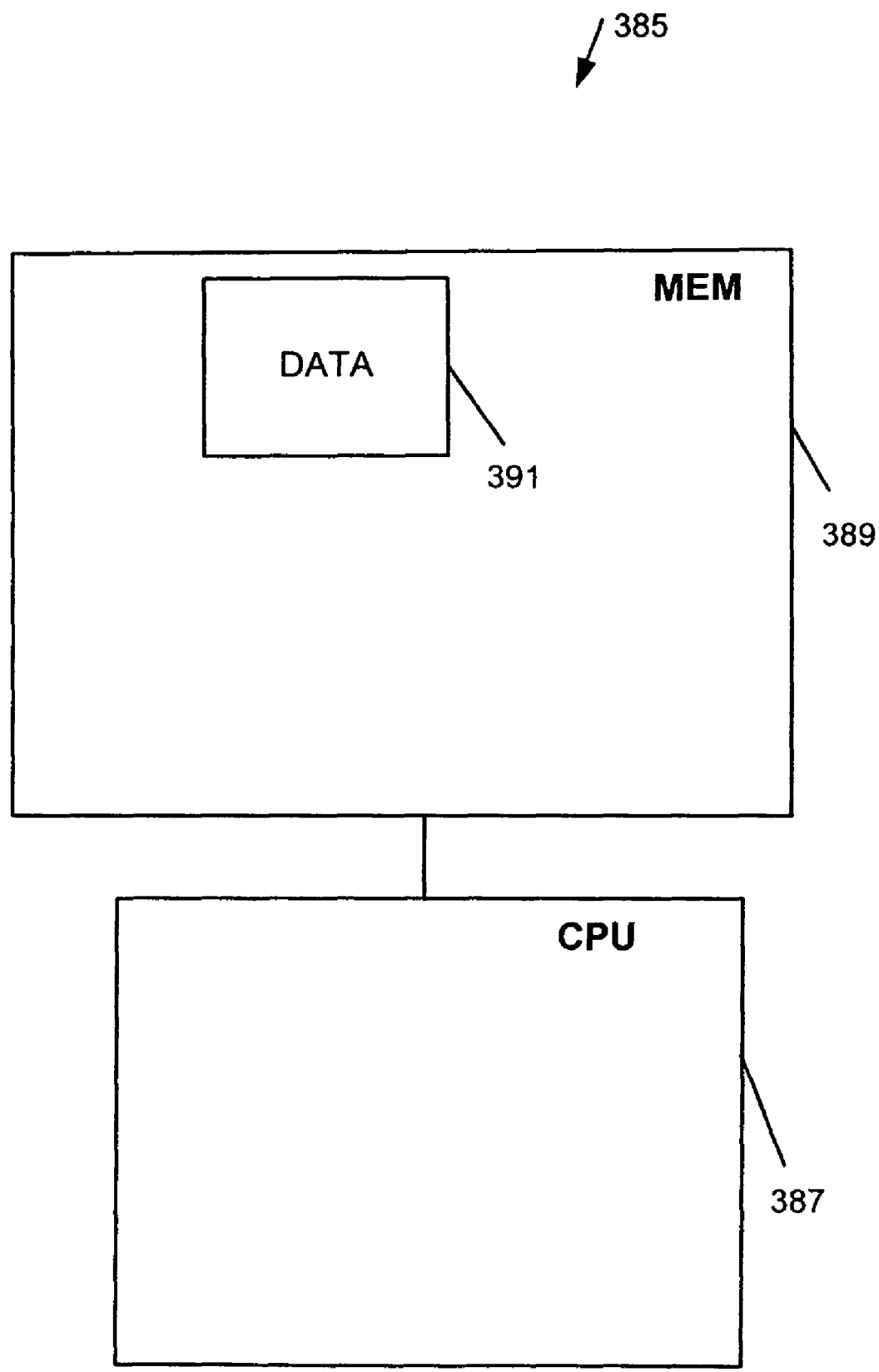
FIG. 3 is a block diagram of an article according to various embodiments of the invention.

For example, FIG. 3 is a block diagram of an article 385 according to various embodiments of the invention. Examples of such embodiments may comprise a computer, a memory system, a magnetic or optical disk, some other storage device, and/or any type of electronic device or system. The article 385 may include one or more processors 387 coupled to a machine-accessible medium such as a memory 389 (e.g., a memory including an electrical, optical, or electromagnetic conductor) having associated information 391 (e.g., computer program instructions and/or data), which, when accessed, results in a machine (e.g., the one or more processors 387) performing such actions as handshaking with an operating system to indicate a state of connection to a network at approximately a time of driver initialization and/or at approximately a time of sensing a state of disconnection from the network.

Other activities may include buffering an Internet protocol packet received from the operating system, and/or opening a wireless network connection at approximately a time of receiving a request from the operating system to utilize the network. Further activities may include passing a private IP address, and/or an IP address obtained from a wireless network, to the operating system. Finally, such activities may include determining whether a PDP context is currently active.

Implementing the apparatus, systems, and methods disclosed herein may enhance GSM/GPRS wireless mobile device operation by simulating a network connection when none exists, and by establishing a network connection upon request by a client operating system.

The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A wireless communication device for Internet-Protocol (IP) communications with a packet-switched network, the wireless communication device comprising:

an IP network stack;
   a network interface device; and
   a dynamic activation module to couple to the network interface device and to open a virtual network connection to an operating system of the wireless communication device,
   wherein the virtual network connection comprises an indication that the packet-switched network is ready and a provision of a private IP address during a time of actual disconnection from the packet-switched network, the private IP address to allow the IP network stack to send data packets to a buffer during the time of actual disconnection,
   wherein the dynamic activation module is configured to open a real network connection comprising an indication that the packet-switched network is ready and a provision of an actual IP address associated with the packet-switched network,
   wherein the real network connection comprises a packet data protocol (PDP) context that is deactivated when no activity is sensed and the dynamic activation module is to activate the virtual network connection when a deactivation of the PDP context is sensed,
   wherein the wireless communication device transitions from the virtual network connection to the real network connection by activating the PDP context when receiving an IP packet for transmission to the packet-switched network, the dynamic activation module to rewrite an IP address header with a network-supplied address prior to transmission of the IP packet, and
   wherein the packet-switched network comprises a serving general packet radio system (GPRS) support node (SGSN) and a backbone GPRS support node (GGSN) coupled with an Internet service provider (ISP).

2. The wireless communication device of claim 1, wherein the dynamic activation module is responsive to a request from the operating system, and
   wherein the virtual connection is also activated upon during device initialization when no actual network connection is active.

3. The wireless communication device of claim 2, further including:
   a network interface device driver module to couple to the network interface device.

4. The wireless communication device of claim 3, further including:
   the operating system to couple to the dynamic activation module.

5. The wireless communication device of claim 4, further including:
   at least one application module coupled to the operating system to open a network socket to the operating system.

6. The wireless communication device of claim 5, further including:
   a packet buffer to couple to the network interface device.

7. The wireless communication device of claim 6, wherein the virtual network connection comprises at least one of the network socket and an operating system socket.

* * * * *